US012679659B2

(12) United States Patent　　(10) Patent No.:　US 12,679,659 B2

Talsma　　(45) Date of Patent:　　Jul. 14, 2026

(54) CONVEYOR BELTS AND MODULES WITH SLIDE BODIES

(71) Applicant: Laitram, L.L.C., Harahan, LA (US)

(72) Inventor: Casper Fedde Talsma, Valencia (ES)

(73) Assignee: Laitram, L.L.C., Harahan, LA (US)

( * ) Notice: Subject to any disclaimer, the term of this patent is extended or adjusted under 35 U.S.C. 154(b) by 160 days.

(21) Appl. No.: 18/281,916

(22) PCT Filed: Mar. 3, 2022

(86) PCT No.: PCT/US2022/018666

§ 371 (c)(1),
(2) Date: Sep. 13, 2023

(87) PCT Pub. No.: WO2022/225615

PCT Pub. Date: Oct. 27, 2022

(65) Prior Publication Data

US 2024/0158176 A1　　May 16, 2024

Related U.S. Application Data

(60) Provisional application No. 63/177,678, filed on Apr. 21, 2021.

(51) Int. Cl.
　　*B65G 17/08*　　(2006.01)
　　*B65G 17/40*　　(2006.01)
(52) U.S. Cl.
　　CPC ............. *B65G 17/08* (2013.01); *B65G 17/40* (2013.01)
(58) Field of Classification Search
　　None
　　See application file for complete search history.

(56) References Cited

U.S. PATENT DOCUMENTS

| | | | |
|---|---|---|---|
| 3,750,801 A | 8/1973 | Karass et al. | |
| 3,762,534 A | 10/1973 | Beresinsky | |
| 3,805,946 A | 4/1974 | Yateman et al. | |
| 4,036,355 A | 7/1977 | Valli | |
| 4,225,034 A | 9/1980 | Sarovich | |
| 4,425,995 A | 1/1984 | Blattermann et al. | |

(Continued)

FOREIGN PATENT DOCUMENTS

| | | |
|---|---|---|
| GB | 2265131 A | 9/1993 |
| JP | 2017521334 A | 8/2017 |
| KR | 10-2018-0056937 A | 5/2018 |

OTHER PUBLICATIONS

Extended European Search Report of European Patent Application No. 22792158.2, dated Jan. 31, 2025, European Patent Office, Munich Germany.

*Primary Examiner* — Gene O Crawford
*Assistant Examiner* — Muhammad Awais
(74) *Attorney, Agent, or Firm* — James T. Cronvich

(57) ABSTRACT

A modular belt constructed of belt-edge modules that include slide bodies that slide along recesses in base module bodies. Slide cam surfaces on the slide bodies' hinge elements interact with base cam surfaces on the base module bodies' hinge elements of adjacent belt rows to move the slide bodies laterally as the belt articulates and de-articulates at its hinge joints. Optional clamp jaws on the base module bodies and the slide bodies are opened and closed by the sliding action. A belt with clamp jaws can be used as a cover belt for a conveyor belt with sideguards.

24 Claims, 9 Drawing Sheets

(56)            References Cited

U.S. PATENT DOCUMENTS

| | | | |
|---|---|---|---|
| 4,832,187 A * | 5/1989 | Lapeyre | B65G 17/08 |
| | | | D8/499 |
| 5,186,310 A | 2/1993 | Winchester | |
| 5,247,789 A * | 9/1993 | Abbestam | B65G 17/08 |
| | | | 59/84 |
| 5,335,768 A * | 8/1994 | Schladweiler | B65G 47/52 |
| | | | 474/224 |
| 5,435,433 A | 7/1995 | Jordan et al. | |
| 6,318,544 B1 * | 11/2001 | O'Connor | B65G 17/24 |
| | | | 198/779 |
| 6,681,922 B2 * | 1/2004 | Corley | B65G 17/08 |
| | | | 198/853 |
| 6,814,223 B1 * | 11/2004 | Verdigets | B65G 17/08 |
| | | | 198/853 |
| 7,216,758 B2 | 5/2007 | Hartness et al. | |
| 7,222,719 B2 | 5/2007 | Shackelford et al. | |
| 9,073,694 B2 * | 7/2015 | Ozaki | B65G 15/30 |
| 11,708,221 B2 * | 7/2023 | Talsma | B65G 17/086 |
| | | | 198/778 |
| 2006/0151304 A1 * | 7/2006 | Ozaki | B65G 17/40 |
| | | | 198/779 |
| 2008/0053796 A1 | 3/2008 | DePaso et al. | |

* cited by examiner

CONVEYOR BELTS AND MODULES WITH SLIDE BODIES

BACKGROUND

The invention relates generally to power-driven conveyors and more particularly to modular articulating conveyor belts having laterally sliding bodies.

Modular plastic conveyor belts are constructed of a series of rows of belt modules linked together by hinge rods at hinge joints. These belts are used to convey many kinds of articles from one point to another. In some cases modular conveyor belts convey articles up or down inclined conveying paths. On steep paths conveyor belts with flights spaced apart along the lengths of the belts are used to prevent conveyed articles from sliding all the way down the belts. Hugger, or cover, belts are often used to cover the conveyor belts on vertical or near-vertical conveying paths to prevent articles from falling off. But articles can fall from the conveyor belts if the cover belts separate from the conveyor belts on particularly steep conveying paths.

SUMMARY

One version of a belt module embodying features of the invention comprises a base module body and a slide body. The base module body, which extends in length from a first end to a second end, laterally in width from a first side to a second side, and in thickness from a top to a bottom, includes first hinge elements along the first end and second hinge elements along the second end and a recess recessed into the base body from the second end to a back wall and having a first width. The slide body has a second width less than the first width and is received in the recess to slide laterally along the recess.

One version of a modular belt embodying features of the invention comprises a series of belt rows of one or more belt modules each extending in length from a first end to a second end. The first end of a belt row is hingedly linked to the second end of an adjacent belt row at a hinge joint. At least some of the belt rows of the one or more belt modules include at least one slider belt module, which includes a recess recessed into the slider belt module from the second end to a back wall and having a first width and a slide body having a second width less than the first width and received in the recess to slide laterally along the recess and the hinge joint.

Another version of a modular belt comprises a series of belt rows of one or more belt modules each extending in length from a first end to a second end and having first hinge elements along the first ends and second hinge elements along the second ends. The first hinge elements of the belt rows are interleaved with the second hinge elements of adjacent belt rows. Hinge rods extending through the interleaved first and second hinge elements link the belt rows together at hinge joints. At least some of the belt rows of the one or more belt modules include a slide body that forms one or more of the second hinge elements. The one or more second hinge elements of the slide body have slide cam surfaces. One or more of the first hinge elements interleaved with the one or more second hinge elements of the slide body have corresponding cam surfaces that push against the corresponding slide cam surfaces on the one or more second hinge elements of the slide body as the modular belt articulates at the hinge joint to slide the slide body laterally.

Yet another version of a modular belt comprises a series of belt rows each extending in length from a first end to a second end and having first hinge elements along the first ends and second hinge elements along the second ends. The first hinge elements of the belt rows are interleaved with the second hinge elements of adjacent belt rows. Hinge rods extending through the interleaved first and second hinge elements link the belt rows together at hinge joints. A laterally outermost first hinge element in each belt row has a first protrusion that extends laterally inward toward the other first hinge elements. A hinge-rod retainer in each row includes a hinge eye at one end and a stop at an opposite second end. The hinge eye is disposed in a gap inward of the laterally outermost first hinge element and receives the hinge rod at the first end of the belt row. The hinge eye has a second protrusion that extends laterally outward toward the laterally outermost first hinge element. The first and second lateral protrusions extend circumferentially part of the way around the hinge rod. The first and second lateral protrusions overlap and contact each other when the hinge joint at the first end of the row is articulated by an angle that is less than a maximum angle the modular belt can articulate forward in standard running operation to position the stop in a blocking position aligned with the hinge elements at the second end of the belt row to prevent the hinge rod from exiting. And the first and second lateral protrusions do not overlap and contact each other to allow the hinge-rod retainer to be moved laterally and rotated about the hinge rod at the first end of the belt row to move the stop from the blocking position when the first hinge joint is articulated by an angle that is greater than the maximum angle the modular belt can articulate in standard running operation.

One version of a conveyor embodying features of the invention comprises a conveyor belt and a modular cover belt. The conveyor belt advances along a conveying path having one or more conveying path segments. The conveyor belt includes a conveying surface extending laterally from a first side to a second side and sideguards standing up from the conveying surface along the first and second sides. The modular cover belt advances along a belt path parallel to the conveying path along at least one of the one or more belt path segments. The modular cover belt includes a series of belt rows of one or more belt modules each extending laterally from a first side to a second side and in length from a first end to a second end. The first end of a belt row is hingedly linked to the second end of an adjacent belt row at a hinge joint. The modular cover belt also includes slider belt modules at the first and second sides. The slider belt modules include first cam surfaces along the first ends and second cam surfaces along the second ends and an outer surface on each slider belt module. A recess in each slider belt module opens onto the second end of each slider belt module. A slide body in each recess along the first or second side has a clamp jaw and second slide cam surfaces along the second end. A stationary clamp jaw in each module body along the first or second side forms clamps along the first and second sides with the clamp jaws on adjacent belt rows of the slide body. The clamps clamp the sideguards of the conveyor belt when some of the first cam surfaces of a slider belt module push against corresponding second slide cam surfaces in an adjacent belt row to slide the slide body laterally in a first direction to close the clamp as the adjacent belt rows articulate into a belt path segment parallel to one of the conveying path segments and to unclamp the sideguards of the conveyor belt when other of the first cam surfaces of the slider belt module push against corresponding second slide cam surfaces in an adjacent belt row to slide the slide body laterally in an opposite second direction to open the clamp as the adjacent belt rows articulate out of the belt path segment parallel to the conveying path segment.

DETAILED DESCRIPTION

Figure 1:
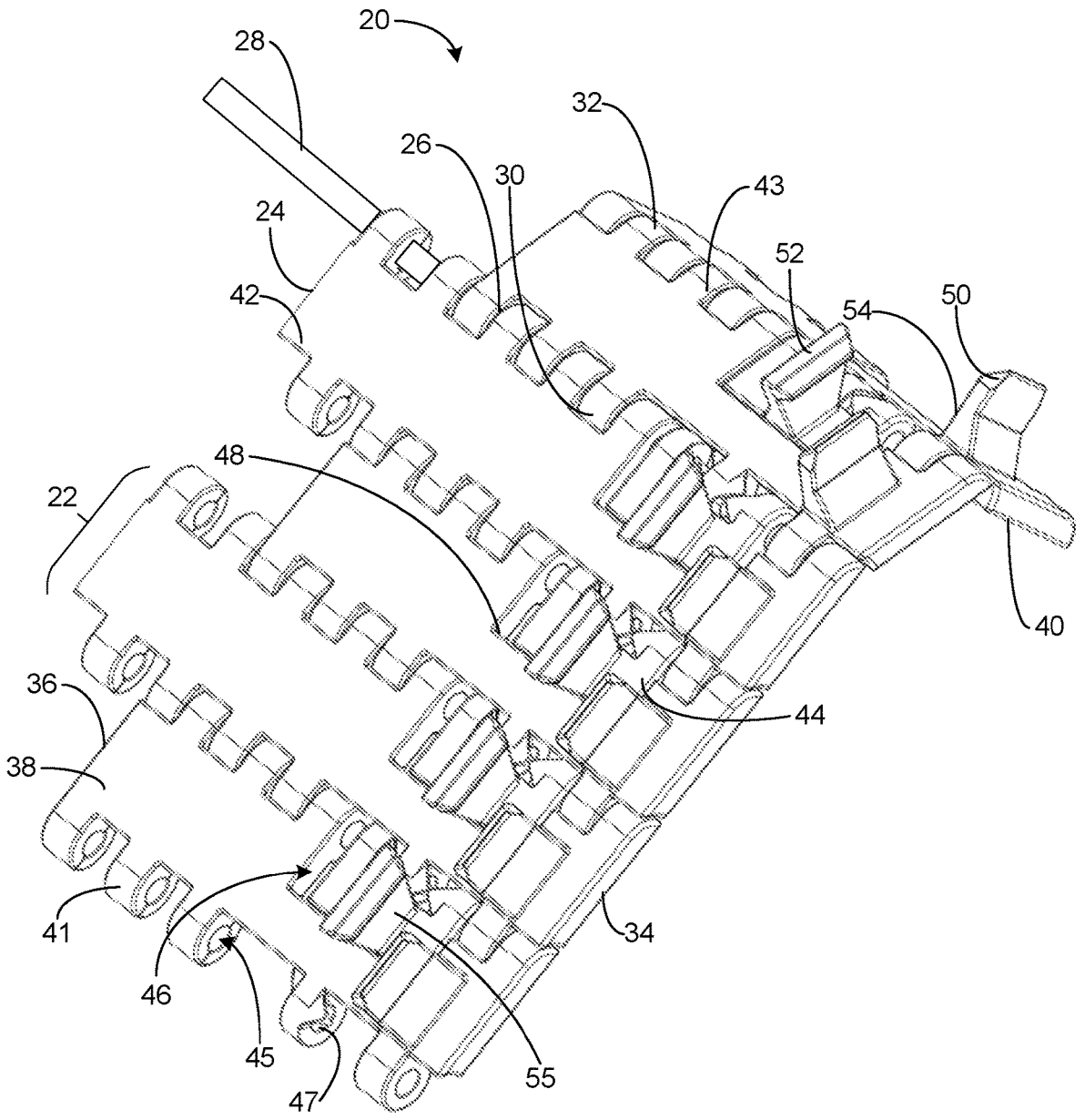
FIG. 1 is an axonometric view of an edge portion of a modular conveyor belt having a slide body with clamp jaws for use as a cover belt.
Figure 2A:
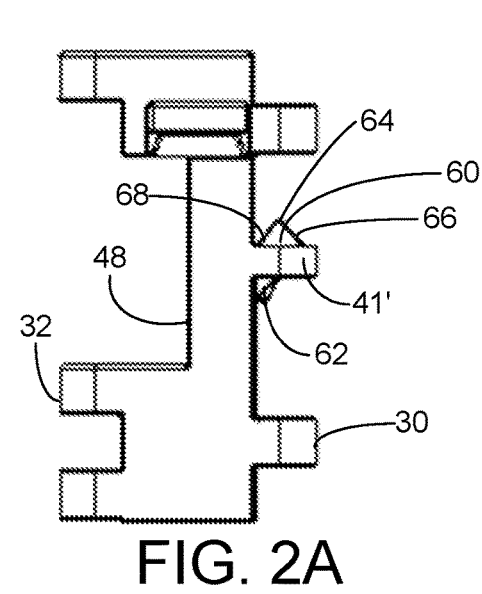
FIGS. 2A-2D are top plan, axonometric, side, and front elevation views of a base edge module for a conveyor belt as in FIG. 1.
Figure 2B:
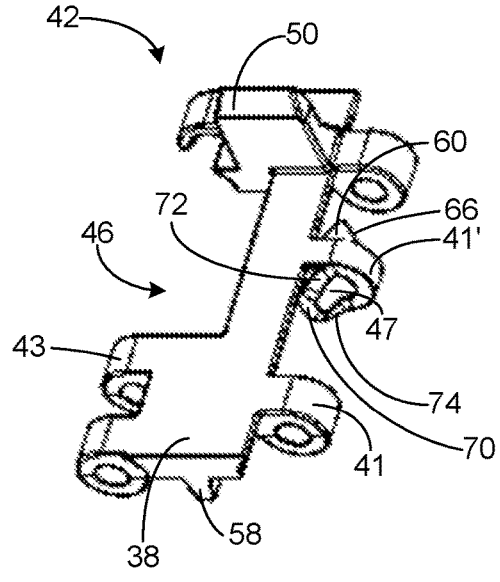
Figure 2C:
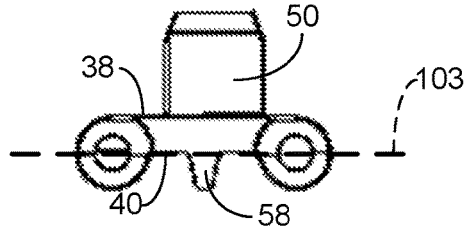
Figure 2D:
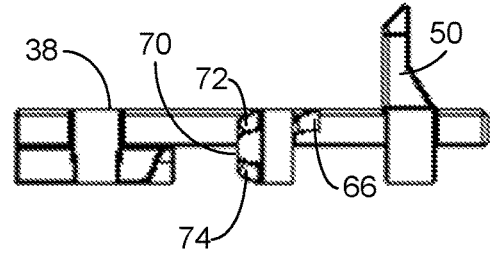
Figure 3A:
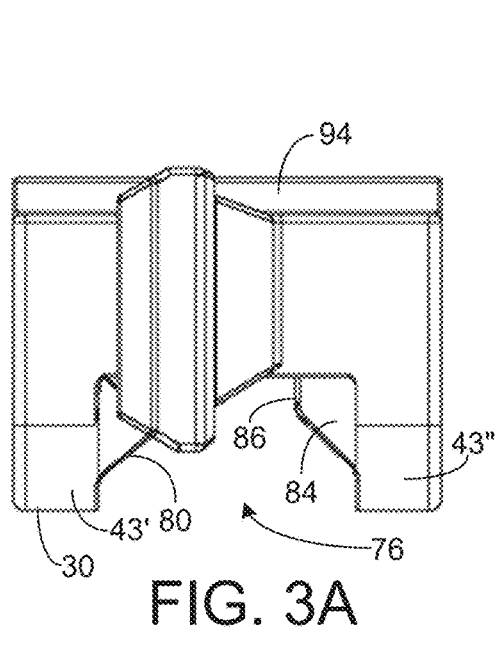
FIGS. 3A-3D are top plan, axonometric, side, and front elevation views of a slide body for a conveyor belt as in FIG. 1.
Figure 3B:
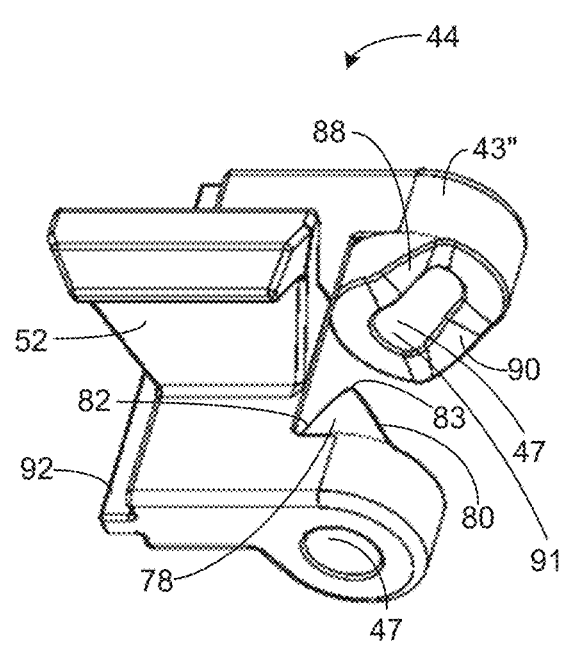
Figure 3C:
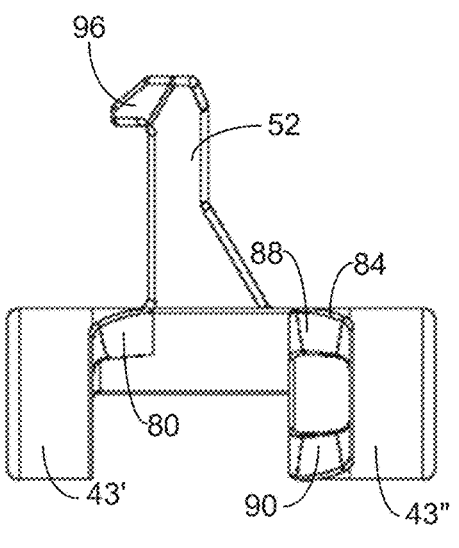
Figure 3D:
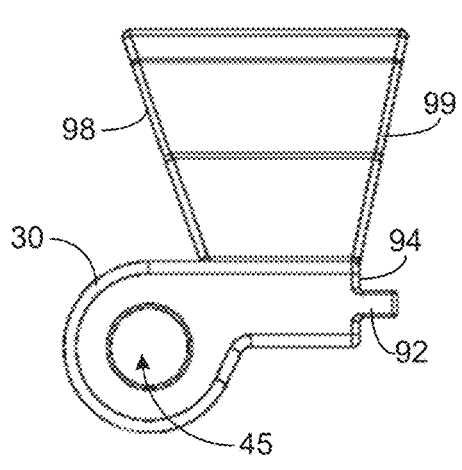

A side edge of a portion of one version of a modular belt embodying features of the invention and useful as a cover belt is shown in FIG. 1. The belt 20 is constructed of a series of rows 22 of belt modules, such as edge modules 24, interior belt modules, and opposite-side edge modules linked together end to end at hinge joints 26 by hinge rods 28. The belt 20 can articulate at the hinge joints 26 when reversing around drive or idle sprockets or rollers.

The edge modules 24 extend in length from a first end 30 to a second end 32, laterally in width from a first side 34 to a second side 36, and in thickness from a top 38, or outer belt surface, to a bottom 40, or inner belt surface. First hinge elements 41 are spaced apart laterally along the first ends 30, and second hinge elements 43 are spaced apart laterally along the second ends 32. The hinge elements 41, 43 have lateral bores 45 bounded by interior surfaces forming bore walls 47. The aligned bores 45 of interleaved first and second hinge elements 41, 43 of adjacent belt rows 22 form lateral passageways for the hinge rods 28 at each hinge joint 26. The edge modules 24 are slider modules that each include a base module body 42 and a slide body 44 received in a recess 46 in the base module body. The recess 46 is recessed into the base module body 42 from the second end 32 to a back wall 48. The recess 46 is wider than the slide body 44 to provide the slide body a range of lateral travel.

In this version the base module body 42 has a base clamp jaw 50 that stands up from the top 38. And the slide body 44 has a slide clamp jaw 52 standing up from the top 38. The two clamp jaws 50, 52 are offset and in partially overlapping confronting relationship. The base clamp jaw 50 is a stationary jaw, and the slide clamp jaw 52 is a movable jaw of a clamp. The base clamp jaw 50 is closer to the first side edge 34 of the module 24 than is the slide clamp jaw 52. And the opposing faces 54, 55 of the clamp jaws 50, 52 can be textured, such as serrated, for a good grip.

FIGS. 2A-2D show four views of the base module body 42. The base module body 42 extends in length from its first end 30 to its second end 32. Its first hinge elements 41 are laterally spaced apart along the first end 30, and its second hinge elements 43 are laterally spaced apart along the second end 32. The stationary base clamp jaw 50 extends upward from the top 38 of the base module body 42. The recess 46 opens onto the second end 32 from the back wall 48. A drive bar 58 extending down from the bottom 40 of the base module body 42 engages drive and idle sprockets around which a belt constructed of modules like this are driven.

A central first hinge element 41' has protrusions 60, 62 that extend outward from laterally opposite sides of the first hinge element. The first protrusion 60, which is beak-shaped, extends from the top side of the hinge element 41' to an apex 64. The beak-shaped protrusion 60 has a curved bottom that forms a circumferentially decreasing lateral extension of the upper boundary of the bore wall 47. Outer and inner sides of the protrusion 60 serve as outer and inner base cam surfaces 66, 68. The base cam surfaces 66, 68 converge toward the apex 64 away from the hinge element 41'. The base cam surfaces 66, 68 could be flat, but are shown as twisted surfaces to accommodate articulation of the modules of adjacent rows. The twisted surfaces can be thought of as flat surfaces twisted about their major axes.

The other protrusion 62 extends from the other side of the hinge element 41' to a blunt end 70. Upper and lower base cam surfaces 72, 74 on the protrusions 62 extend from the inner side of the hinge element 41' to the blunt end 70. The upper and lower base cam surfaces 72, 74 are twisted surfaces. The protrusion 62 forms a lateral extension of the bore wall 47 that decreases in circumferential coverage away from the hinge element 41'.

The slide body 44 shown in FIGS. 3A-3D has two first slide hinge elements 43', 43" spaced apart across a gap 76 along its first end 30. The lateral bores 45 of the first slide hinge elements 43', 43" are bounded by the bore walls 47. The laterally outer slide hinge element 43' has a beak-shaped protrusion 78 like the beak-shaped protrusion 60 (FIGS. 2A-2B) of the base module body 42. The protrusion 78, which extends from the top of the laterally outer slide hinge element 43' toward the laterally inner slide hinge element 43", has two converging cam surfaces: an outer slide cam surface 80 and an inner slide cam surface 82 that meet at an apex 83. The slide cam surfaces 80, 82 are twisted like cam surfaces 66, 68 on the base module body 42.

The inner slide hinge element 43" has a protrusion 84 that extends toward the outer slide hinge element 43' to a blunt end 86. The protrusion 84 is the same shape as the protrusion 62 (FIGS. 2A-2D) on the base module body 42. Upper and lower slide cam surfaces 88, 90 are formed on the protrusion 84 from its side out to the blunt end 86. Both slide protrusions 78, 84 have curved interior surfaces 91 that form partial circumferential extensions of the bore walls 47. A rib 92 extends laterally along an inner end 94 of the slide body 44. The rib 92 is received in a lateral groove 93 (FIG. 9) in the back wall of the base module body for support. Alternatively, a rib could be formed on the back wall of the base module body, and a corresponding lateral groove could be formed on the inner end 94 of the slide body 44.

The slide clamp jaw 52 extends upward from the upper surface of the slide body 44. The clamp jaw 52 has a hook 96 at an upper end that protrudes toward the laterally outer slide hinge element 43'. Outer and inner edges 98, 99 of the slide clamp jaw 52 that diverge from the upper surface of the slide body 44 to the hook 96 at the jaw's upper end give the slide clamp jaw 52 a trapezoidal shape that is longer along the upper end. Even though the slide clamp jaw 52 is shown with a hook 96 in this version, clamp jaws without hooks can be used.

Figure 4A:
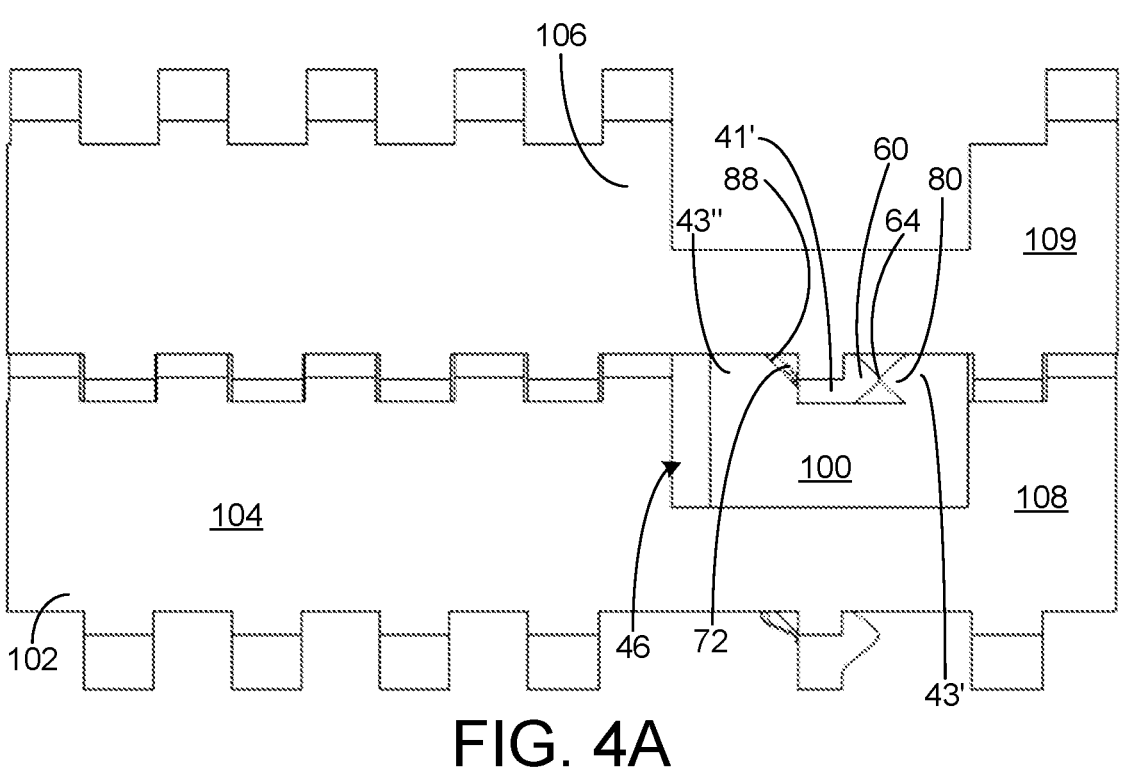
FIGS. 4A and 4B are top and bottom views of two edge modules and a slide body as in FIG. 1 without clamp jaws and with the slide body positioned toward the outer sides of the modules.
Figure 4B:
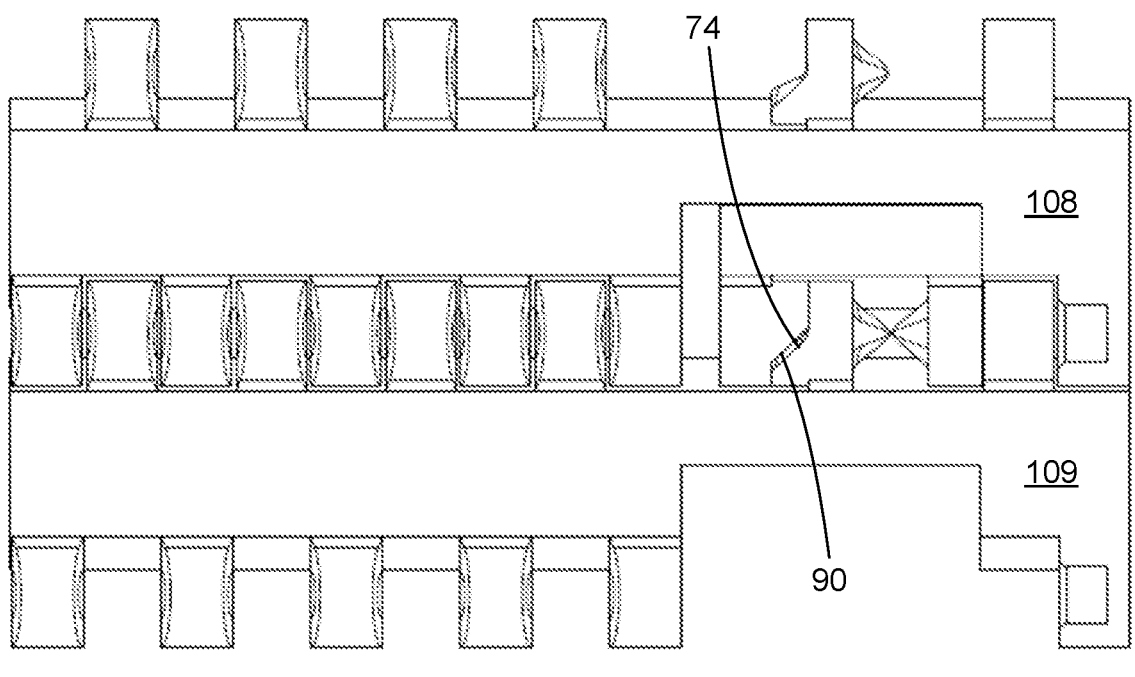

The interaction of the cam surfaces sliding along each other as their belt rows pivot on the hinge rod causes the slide body to move along the recess as shown in FIGS. 4A, 4B, 5A, 5B, 6A, and 6B. In FIGS. 4A and 4B a slide body 100 without a clamp jaw, but otherwise identical to the slide body 44 of FIGS. 3A-3D is shown in an outermost position (rightmost in the figures) in a portion of a modular belt. When the belt is running along a carryway, the flat tops 102 of the modules 104 of adjacent belt rows are coplanar because the pitch lines (103, FIG. 2C) of adjacent belt rows are aligned. (The pitch line of a belt module is an imaginary line that extends through the rod-hole centerlines along each end of the module.) The second slide hinge elements 43', 43" of the slide body 100 flank the aligned first hinge element 41' of the base module body 106 of an adjacent belt row. The apices 64, 83 of the beak-shaped protrusions 60, 80 confront each other, the upper base cam surface 72 confronts the upper slide cam surface 88 without forceful contact, and the lower base cam surface 74 confronts the lower slide cam surface 90.

Figure 5A:
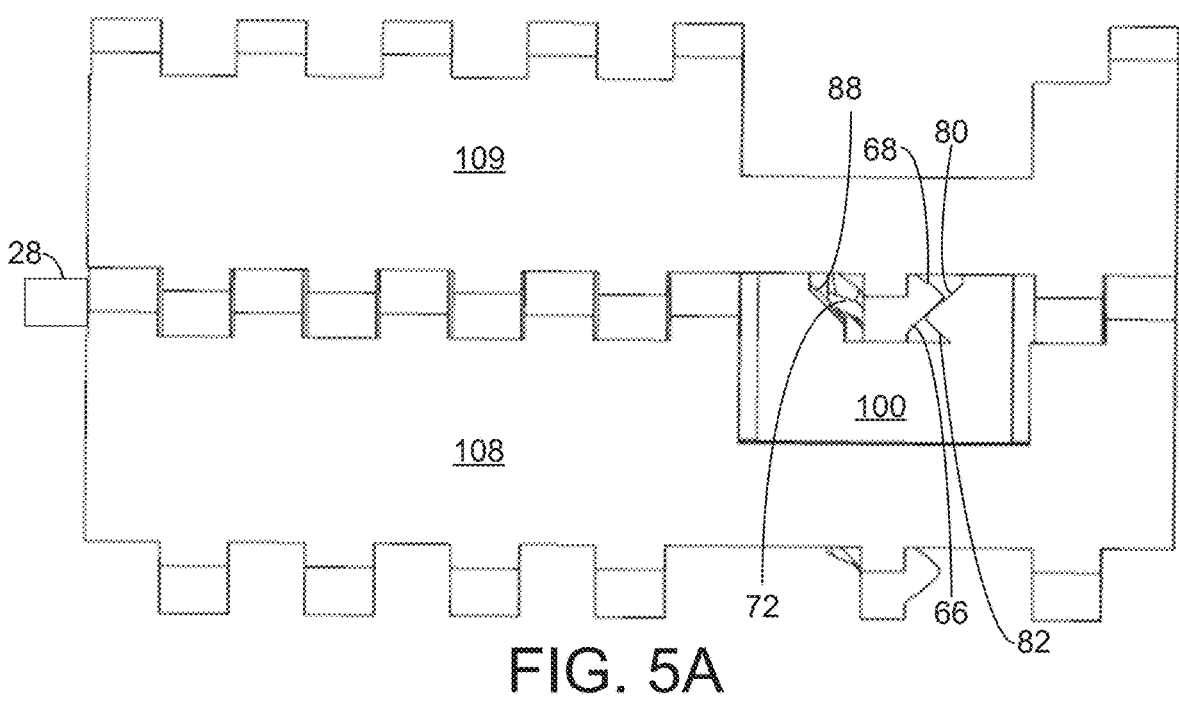
FIGS. 5A and 5B are top and bottom views of the two edge modules as in FIGS. 4A and 4B with the slide body farther away from the outer sides of the modules.
Figure 5B:
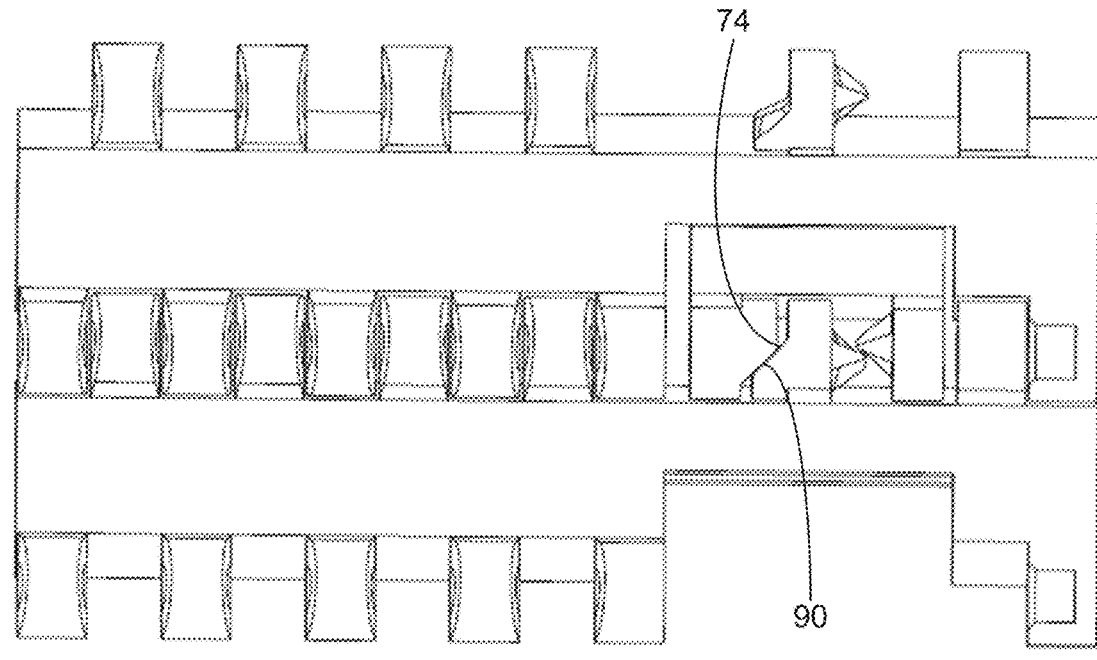

As the two belt rows 108, 109 articulate about a sprocket as in FIGS. 5A and 5B, the lower slide cam surface 90 in the belt row 108 slides along the lower base cam surface 74 of the adjacent belt row 109, causing the slide body 100 to slide along the recess 46 away from the outer side of the recess 46 (toward the left in the figures). FIGS. 5A and 5B show the positions of all the cam surfaces 66, 68, 72, 74, 80, 82, 88, 90 when the slide body 100 is at an intermediate position as its row 108 starts to pivot on the hinge rod 28. The pitch lines of the two rows 108, 109 are no longer aligned.

Figure 6A:
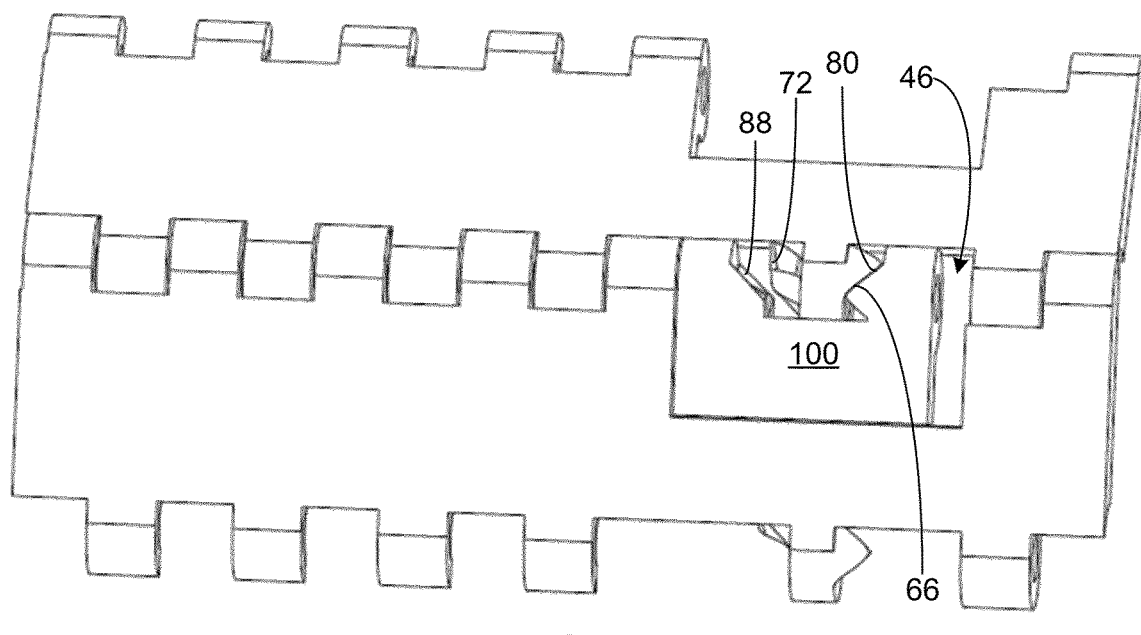
FIGS. 6A and 6B are top and bottom views of the two edge modules as in FIGS. 4A and 4B with the slide body at its greatest distance from the outer sides of the modules.
Figure 6B:
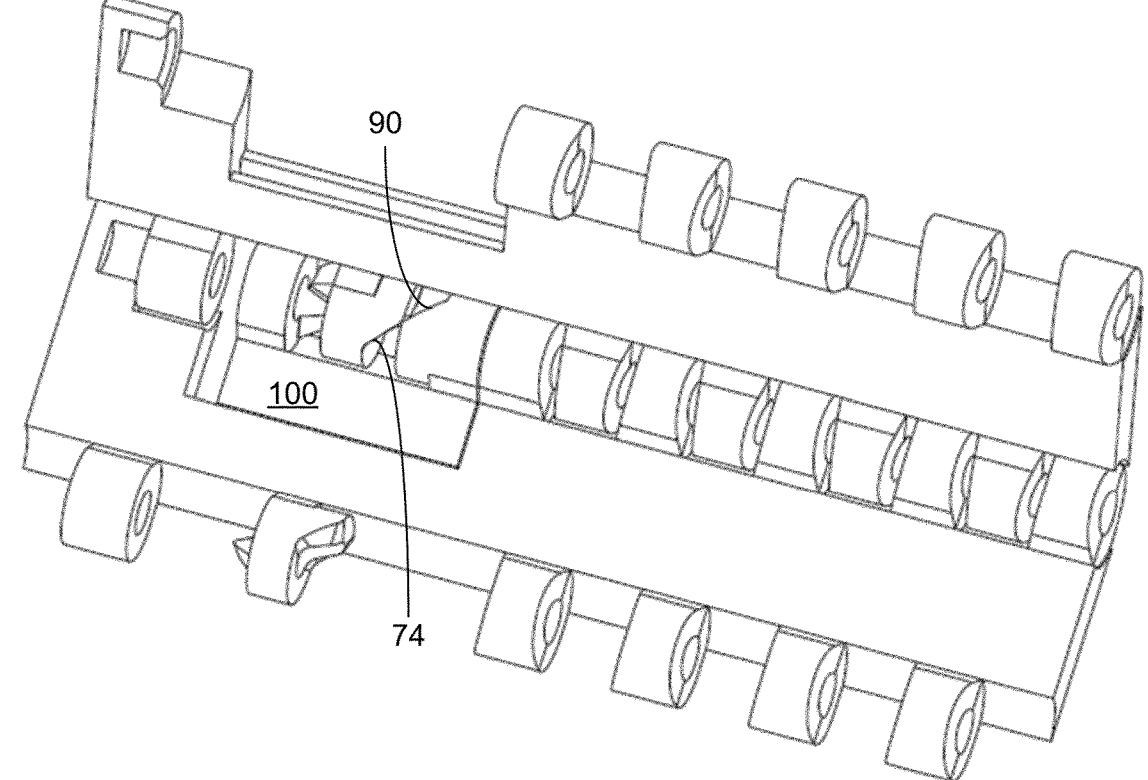

In this intermediate position of the slide body 100, the outer base cam surface 66 confronts the outer slide cam surface 80 while the lower slide cam surface 90 is engaged with the lower base cam surface 74 to continue the slide to the right in FIGS. 5A and 5B. The upper base cam surface 72 and the upper slide cam surface 88 are separated. When the slide body 100 has been pushed by the interaction of the lower base cam surface 74 with the lower slide cam surface 90 to the laterally innermost position in the recess 46 as shown in FIGS. 6A and 6B, the outer base cam surface 66 and the outer slide cam surface 80 confront each other, the upper base cam surface 72 and the upper slide cam surface 88 confront each other, and the lower base cam surface 74 is past the lower slide cam surface 90. Thus, as the modules articulate forward at the hinge joints about a sprocket, the interaction of the lower base cam surface 74 with the lower slide cam surface 90 forces the slide body 100 from the laterally outermost position of FIGS. 4A and 4B to the laterally innermost position of FIGS. 6A and 6B.

The other base cam surfaces 60, 68, 72 and corresponding slide cam surfaces 80, 82, 88 interact to cause the slide body 100 to move along the recess under different conditions. When the belt row containing the slide body 100 exits a sprocket upon its return to the carryway, the interaction of the outer base cam surface 66 with the outer slide cam surface 80 forces the slide body toward the laterally outermost position of FIGS. 4A and 4B. When the belt row containing the slide body 100 backbends, or reverse articulates, around a return roller or shoe in the belt return or on entering an incline, the interaction of the upper base cam surface 72 with the upper slide cam surface 88 pushes the slide body toward its laterally innermost position. And when the belt row containing the slide body 100 exits the backbend or the incline, the interaction of the inner base cam surface 68 with the inner slide cam surface 82 returns the slide body to the laterally outermost position. Thus, the slide body 100 is at its outermost position only when the pitch lines of its own row and its adjacent row are aligned. All the cam surfaces 66, 68, 72, 74, 80, 82, 88, 90 extend obliquely from the sides of the hinge elements. And the base cam surfaces 66, 68, 72, 74 are parallel to the corresponding slide cam surfaces 80, 82, 88, 90 with which they interact. Only when two adjacent belts rows are undergoing articulation while rounding a sprocket or backbending and the pitch lines of the adjacent rows are non-coplanar do corresponding base and slide cam surfaces push against each other to slide the slide body laterally.

Figures 7, 8:
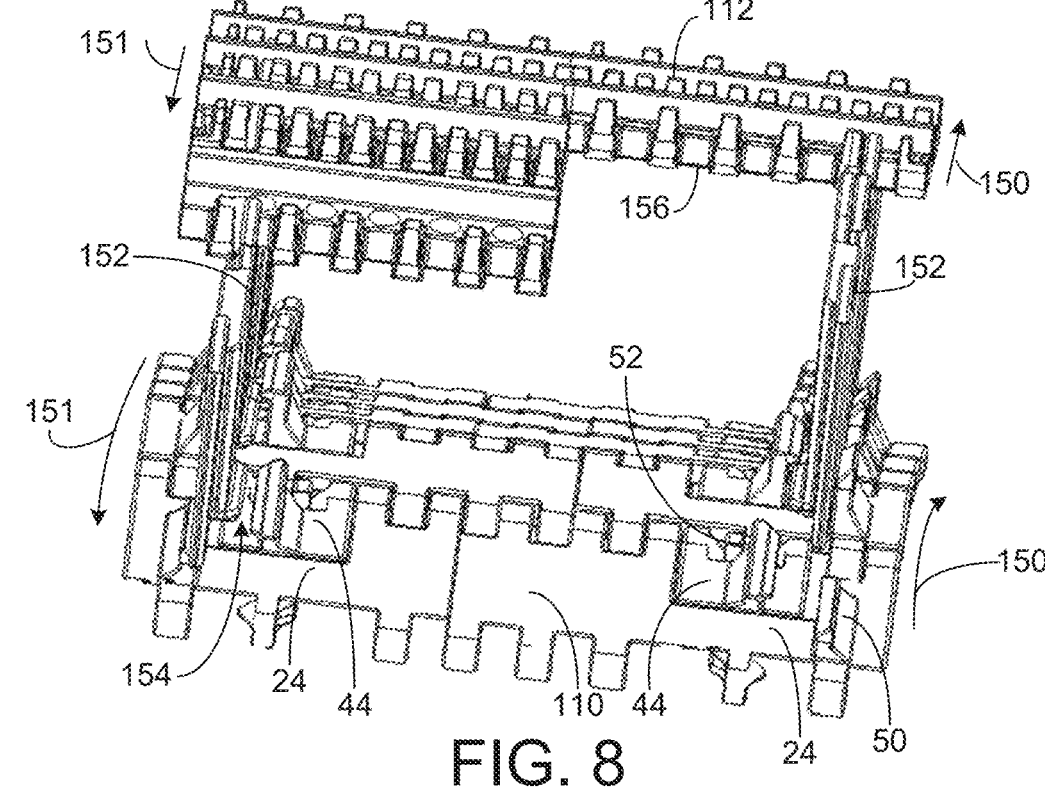
FIG. 7 is an axonometric view of a conveyor using a cover belt as in FIG. 1 to cover a conveyor belt having sideguards along vertical conveying paths.
FIG. 8 is an enlarged view of a portion of the conveyor of FIG. 7 showing the engagement and disengagement of clamp jaws in the cover belt from the sideguards of the conveyor belt.

FIG. 7 shows a conveyor system in which a cover belt 110 constructed of modules as in FIG. 1 is used to cover a conveyor belt 112 along a portion of the conveyor belt's conveying path. The conveyor belt 112 is driven in a conveying direction 116 by a drive 114 comprising a motor, a gear train, a drive shaft, bearings, and sprockets. The conveyor belt's conveying path in a return includes a steep downward segment 118, such as a vertical segment, after the drive 114, a lower catenary segment 120 between two idle sprocket sets 122, 123, and an upward vertical segment 124 leading to an idle sprocket set 126. Exiting the idle sprockets 126, the conveyor belt 112 follows a short upper horizontal path segment 128 before entering a downward vertical segment 130 after another idle sprocket set 132. The conveyor belt's path then reverses around lower idle rollers 134 onto an upward vertical segment 136. The conveyor belt 112 continues along another horizontal path segment 138 after rounding another idle sprocket set 140 to complete the circuit at the drive 114.

The cover belt 110 is driven in the same direction on parallel path segments and at the same speed as the conveyor belt 112 by a drive 142, but along a different path. After rounding a direction-changing element, such as an idle sprocket set 144, the cover belt 110 engages the conveyor belt 112 on its first upper horizontal path segment 128. The cover belt's clamp jaws 50, 52 clamp the conveyor belt's sideguards 152 at the sides of the belts. The cover belt 110 covers the conveyor belt 112 from that point on the conveyor belt's path all the way to the drives 114, 142 at which point the clamp jaw opens and the cover belt releases as it articulates about another direction-changing element 145. The cover belt then follows an upper catenary segment 146 back to the idle sprocket set 144.

The engagement or disengagement of the cover belt 110 with the conveyor belt 112 is shown in FIG. 8. Initial engagement as occurs when the cover belt 110 exits its idle sprocket set 144 (FIG. 7) and enters a straight path segment for which the direction of travel of both belts is indicated by arrows 150. The conveyor belt 112 has sideguards 152 along each side that extend outward of an outer conveying surface 156 of the conveyor belt. The cover belt 110 is constructed of slide modules 24 at each side. When the slide modules 24 are articulating about the idle sprocket set 144 (FIG. 7) or any direction-changing element, the slide bodies 44 are pushed to their laterally innermost positions opening the clamp jaws. In the open clamp position, the clamp jaws 50, 52 are maximally separated to readily receive the sideguards 152 of the conveyor belt 112 in the open mouth 154 of the clamps. As the cover belt 110 exits the idle sprocket sets 144, the slide body 44 moves to its laterally outermost position in a closed clamp position closing the clamp jaws 50, 52 around the sideguards 152. Together with the sideguards 152, the cover belt 110 confines articles conveyed by the conveyor belt 112 to the conveyor belt. Although not shown, the conveyor belt 112, when used in a configuration that has vertical or steeply inclined or declined conveying segments, would typically have laterally extending flights standing up from the article-conveying surface 156 to catch articles falling on the steep path segments.

Disengagement of the cover belt 110 from the conveyor belt 112 is indicated by viewing FIG. 8 as though the belts are driven in the direction of arrows 151. The cover belt's clamp jaws 50, 52 are clamped against the sideguards 152 of the conveyor belt 112 as the cover belt starts to travel around the drive sprocket set of its drive 142 (FIG. 7). As the cover belt 110 articulates about the drive sprocket set, the slide bodies 44 move from the closed clamp position to the open clamp position releasing the sideguards 152.

Figure 9:
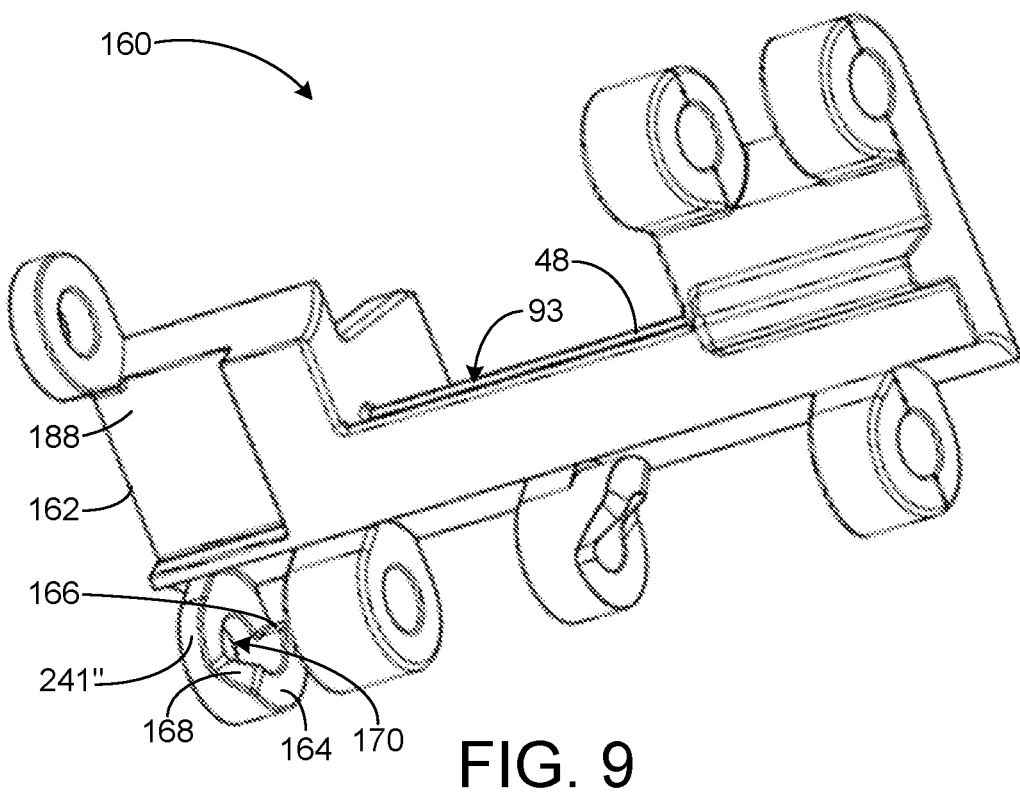
FIG. 9 is an axonometric view of an edge module usable with the conveyor belt as in FIG. 1 and accommodating a hinge-rod retainer.

Another version of a base module body 160 is shown in FIG. 9. It is identical to the base module body 42 of FIG. 2B, except for additional structure at its outer side edge 162. The additional structure is characterized by an additional first hinge element 241″, which has an inward protrusion 164 at the distal end of the hinge element. The protrusion 164 has an abrupt end 166 at a top end and a sloped end 168 at the bottom. The protrusion 164 forms a circumferentially partial extension of the bore 170.

Figure 10:
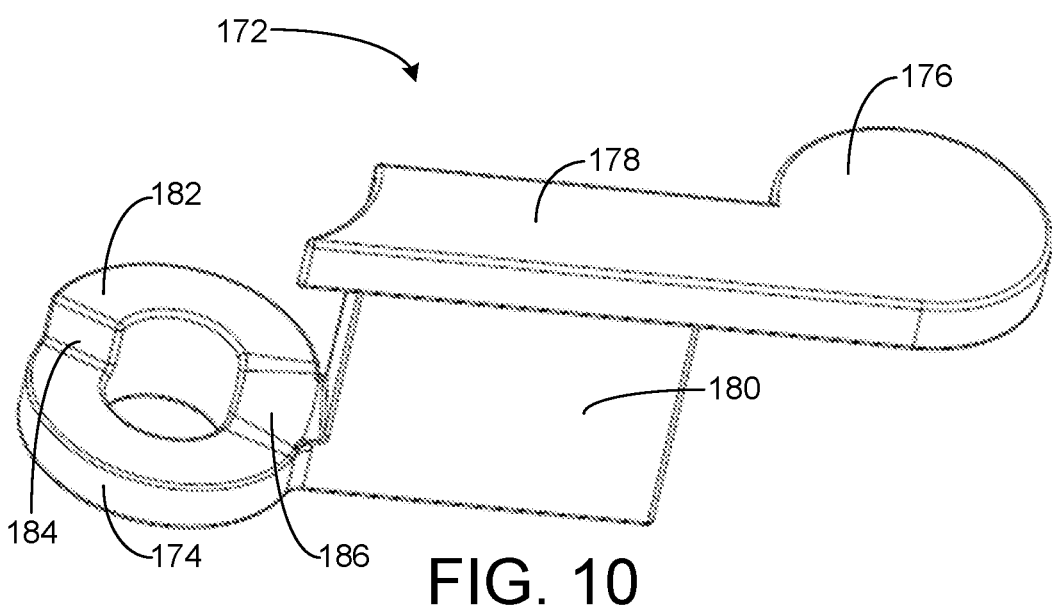
FIG. 10 is an axonometric view of a hinge-rod retainer usable in the edge modules of FIG. 9.

FIG. 10 shows a hinge-rod retainer 172 with a hinge eye 174 at one end and a stop 176 at the other end. The stop 176 extends from a shank 178 attached to a base 180. The hinge eye 174 also extends from the base 180. Like the base module body's outermost hinge element 241″, the hinge eye 174 has a similar protrusion 182 having an abrupt end 184 and a sloped end 186. A depression 188 in the bottom edge of the base module body 160 of FIG. 9 is shaped to receive the base 180 of the hinge-rod retainer 172 when the retainer is in a blocking position as described with respect to FIGS. 11A-11C.

Figure 11A:
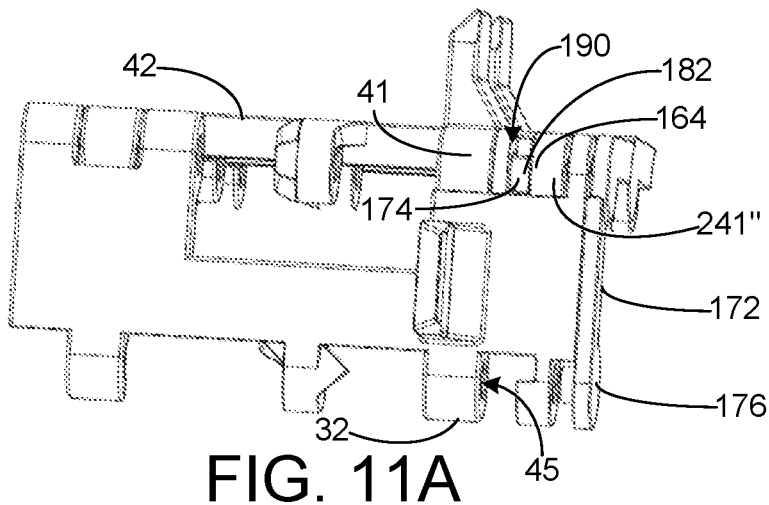
FIGS. 11A-11C are sequential views of edge modules as in FIG. 9 showing the sliding of the hinge-rod retainer of FIG. 10 from a rod-locking position to a removed position.
Figure 11B:
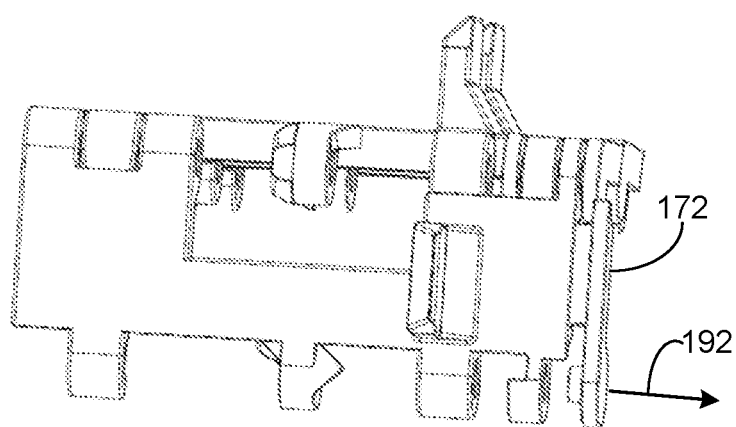
Figure 11C:
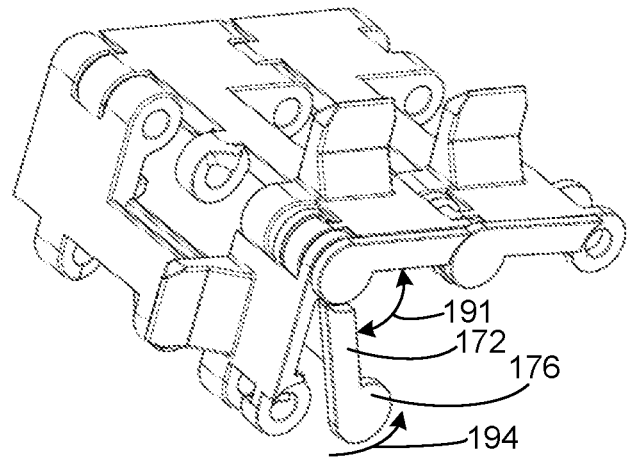

The hinge-rod retainer 172 is shown in a blocking position in FIG. 11A. The stop 176 is aligned with the bores 45 to block a hinge rod from exiting the lateral passageway at the second end 32 of the belt row. While the belt is running on a straight path, the retainer 172 is held in the blocking position because the lateral protrusions 164, 182 overlap at least partly and keep the hinge eye 174 at the innermost position in a gap 190 recessed between the two outermost first hinge elements 41, 241″ of the base module body 42 of the adjacent belt row. The retainer 172, which can be rotated about the hinge rod received in the hinge eye 174, is moved from its blocking position to its unblocking position by manually articulating the two belt rows by a release angle that is greater than the maximum angle the belt can articulate in standard running operation. The release angle 191 shown in this example is about 90° as best seen in FIG. 11C. The release angle 191 is set by the circumferential extents of the protrusions 164, 182. When the two adjacent belt rows are pivoted enough that the protrusions 164, 182 no longer overlap as in FIG. 11B, the retainer 172 can be manually slid outward as indicated by arrow 192. Then the retainer 172 can be manually rotated, as indicated by arrow 194 in FIG.

11C to the unblocking position, in which the stop 176 is no longer aligned with the hinge rod's lateral passageway. With the hinge-rod retainer 172 in the unblocking position, a hinge rod can be removed or inserted. The hinge-rod retainer 172 is returned to the blocking position by reversing the procedure. The sloped ends 168, 186 of the protrusions 164, 182 aid in the smooth return of the retainer 172 to the blocking position. Thus, the hinge-rod retainer is another version of a slide body in a modular belt.

What is claimed is:

1. A belt module comprising:
   a base module body that extends in length from a first end to a second end, laterally in width from a first side to a second side, and in thickness from a top to a bottom and including:
      first hinge elements along the first end and second hinge elements along the second end;
      a recess recessed into the base module body from the second end to a back wall and having a first width;
   a slide body having a second width less than the first width and received in the recess to slide laterally along the recess.

2. The belt module as claimed in claim 1 wherein the slide body has an inner end that slides along the back wall of the recess and an opposite outer end and slide hinge elements along the outer end that are aligned with the second hinge elements of the base module body when the slide body is received in the recess.

3. The belt module as claimed in claim 2 wherein the back wall has a laterally extending rib and the inner end of the slide body has a mating lateral groove receiving the laterally extending rib to slidingly support the inner end of the slide body in the recess or the back wall has a laterally extending groove and the inner end of the slide body has a mating lateral rib received in the laterally extending groove to slidingly support the inner end of the slide body in the recess.

4. The belt module as claimed in claim 2 wherein the slide hinge elements include a first slide hinge element and a second slide hinge element and wherein the first slide hinge element has a first protrusion with an inner slide cam surface and an outer slide cam surface that extend toward the second slide hinge element and wherein the second slide hinge element has a second protrusion with an upper slide cam surface and a lower slide cam surface that extend toward the first slide hinge element.

5. The belt module as claimed in claim 4 wherein the inner and outer slide cam surfaces extend obliquely opposite to each other so that the inner and outer slide cam surfaces meet at an apex of the first protrusion.

6. The belt module as claimed in claim 4 wherein the inner and outer and upper and lower slide cam surfaces are twisted surfaces.

7. The belt module as claimed in claim 4 wherein the first and second slide hinge elements have lateral bores bounded by bore walls and wherein the first and second protrusions have interior surfaces forming circumferentially partial lateral extensions of the bore walls.

8. The belt module as claimed in claim 1 wherein one of the first hinge elements of the base module body has laterally opposite sides and includes a first protrusion with an inner base cam surface and an outer base cam surface protruding obliquely from one of the laterally opposite sides and a second protrusion with an upper base cam surface and a lower base cam surface protruding from the other of the laterally opposite sides.

9. The belt module as claimed in claim 8 wherein the inner and outer base cam surfaces extend obliquely opposite each other so that they meet at an apex of the first protrusion.

10. The belt module as claimed in claim 8 wherein the inner and outer and upper and lower base cam surfaces are twisted surfaces.

11. The belt module as claimed in claim 8 wherein the first hinge elements of the base module body have lateral bores bounded by bore walls and wherein the first and second protrusions have interior surfaces forming circumferentially partial lateral extensions of the bore walls.

12. The belt module as claimed in claim 1 wherein the base module body includes a base clamp jaw standing up from the top of the base module body and wherein the slide body includes a slide clamp jaw standing up from the top of the slide body.

13. A modular belt comprising:

a series of belt rows of one or more belt modules each extending in length from a first end to a second end, wherein the first end of a belt row is hingedly linked to the second end of an adjacent belt row at a hinge joint;

wherein at least some of the belt rows of the one or more belt modules include at least one slider belt module that includes:

a recess recessed into the slider belt module from the second end to a back wall and having a first width;

a slide body having a second width less than the first width and received in the recess to slide laterally along the recess and the hinge joint.

14. The modular belt as claimed in claim 13 wherein:

each belt row extends laterally in width from a first side to a second side, and in thickness from a top to a bottom and has first hinge elements laterally spaced along the first end and second hinge elements laterally spaced along the second end;

the first and second hinge elements have bores and the first hinge elements of a belt row are interleaved with the second hinge elements of an adjacent belt row so that the bores through the interleaved first and second hinge elements are aligned to form a lateral passageway;

the modular belt includes hinge rods received in the aligned passageways to join adjacent belt rows together at the hinge joints;

the slider belt module includes one or more of the first hinge elements and one or more of the second hinge elements;

the slide body has one or more of the second hinge elements and slides laterally along the recess and the hinge rod.

15. The modular belt as claimed in claim 14 wherein:

a first one of the second hinge elements of the slide body includes a first lateral protrusion and a second one of the second hinge elements of the slide body includes a second lateral protrusion, wherein the first and second lateral protrusions extend toward each other; and a first one of the first hinge elements of a slider belt module in an adjacent belt row is disposed between the first and second lateral protrusions of the slide body and has a first lateral protrusion extending toward the first lateral protrusion of the slide body and a second lateral protrusion extending toward the second lateral protrusion of the slide body.

16. The modular belt as claimed in claim 15 wherein:

the first lateral protrusion of the slide body includes two first slide cam surfaces that converge from the first one of the second hinge elements to meet at an apex above the bore;

the first lateral protrusion of the first one of the first hinge elements of the slider belt module in the adjacent belt row includes two first cam surfaces that converge from the first one of the first hinge elements to meet at an apex above the bore, wherein the apex of the slide cam surfaces opposes the apex of the first cam surfaces of the slider belt module in the adjacent belt row when the rows are not articulated at the hinge rod;

the second lateral protrusion of the slide body includes two second slide cam surfaces that extend obliquely from the second one of the second hinge elements away from the second end from positions above and below the bore of the second one of the second hinge elements; and the second lateral protrusion of the first one of the first hinge elements of the adjacent belt row includes two second cam surfaces that extend obliquely from the first one of the first hinge elements away from the first end from positions above and below the bore through the first one of the first hinge elements.

17. The modular belt as claimed in claim 14 comprising a hinge-rod retainer including:

a stop at a first end;

a hinge eye at an opposite second end having a first lateral protrusion;

a shank between the first end and the second end;

wherein the hinge eye resides between two of the second hinge elements and receives a first one of the hinge rods at a first hinge joint and the first lateral protrusion extends circumferentially part way around the hinge rod;

wherein one of the second hinge elements has a second lateral protrusion extending toward the first lateral protrusion that extends circumferentially part way around the hinge rod;

wherein the first and second lateral protrusions overlap and contact each other when the first hinge joint is articulated by an angle that is less than a maximum angle the modular belt can articulate in standard running operation to position the stop in a blocking position covering the lateral passageway of a consecutive hinge joint to prevent the hinge rod from exiting the lateral passageway; and wherein the first and second lateral protrusions do not overlap and contact each other to allow the hinge-rod retainer to be moved laterally and rotated to move the stop from the blocking position when the first hinge joint is articulated by an angle that is greater than the maximum angle the modular belt can articulate in standard running operation.

18. The modular belt as claimed in claim 13 wherein the at least one slider belt module in a first one of the belt rows has one or more cam surfaces and the slide body in an adjacent belt row has one or more corresponding slide cam surfaces that push against the corresponding cam surfaces in the first one of the belt rows to slide the slide body laterally when the pitch line of the first one of the belt rows is non-coplanar with the pitch line of the adjacent row.

19. A modular belt comprising:

a series of belt rows of one or more belt modules each extending in length from a first end to a second end and having first hinge elements along the first ends and second hinge elements along the second ends, wherein the first hinge elements of the belt rows are interleaved with the second hinge elements of adjacent belt rows;

hinge rods extending through the interleaved first and second hinge elements to link the belt rows together at hinge joints;

wherein at least some of the belt rows of the one or more belt modules include a slide body forming one or more of the second hinge elements;

wherein the one or more second hinge elements of the slide body have slide cam surfaces;

wherein one or more of the first hinge elements interleaved with the one or more second hinge elements of the slide body have corresponding cam surfaces that push against the corresponding slide cam surfaces on the one or more second hinge elements of the slide body as the modular belt articulates at the hinge joint to slide the slide body laterally.

20. The modular belt as claimed in claim 19 wherein the slide cam surfaces and the cam surfaces are arranged so that no more than one pair of the corresponding slide cam surfaces and cam surfaces are in pushing contact at a time.

21. The modular belt as claimed in claim 19 comprising four pairs of slide cam surfaces and corresponding cam surfaces and wherein a first pair push against each other as the belt rows articulate forward and wherein a second pair push against each other as the belt rows articulate back from a forward articulation and wherein a third pair push against each other when the belt rows backbend and wherein a fourth pair push against each other when the belt rows return from a backbend.

22. The modular belt as claimed in claim 19 comprising four pairs of slide cam surfaces and corresponding cam surfaces and wherein a first pair and a second pair are arranged to slide the slide body in a first lateral direction when the first pair or the second pair push against each other and a third pair and a fourth pair are arranged to slide the slide body in an opposite second lateral direction when the third pair or the fourth pair push against each other.

23. A modular belt comprising:

a series of belt rows each extending in length from a first end to a second end and having first hinge elements along the first ends and second hinge elements along the second ends, wherein the first hinge elements of the belt rows are interleaved with the second hinge elements of adjacent belt rows;

hinge rods extending through the interleaved first and second hinge elements to link the belt rows together at hinge joints;

wherein a laterally outermost first hinge element in each belt row has a first protrusion extending laterally inward toward the other first hinge elements;

a hinge-rod retainer in each row including:

a hinge eye at one end disposed in a gap inward of the laterally outermost first hinge element and receiving the hinge rod at the first end of the belt row and having a second protrusion extending laterally outward toward the laterally outermost first hinge element;

a stop at an opposite second end of the hinge-rod retainer;

wherein the first and second lateral protrusions extend circumferentially part of the way around the hinge rod;

wherein the first and second lateral protrusions overlap and contact each other when the hinge joint at the first end of the row is articulated by an angle that is less than a maximum angle the modular belt can articulate forward in standard running operation to position the stop in a blocking position aligned with the hinge elements at the second end of the belt row to prevent the hinge rod from exiting; and wherein the first and second lateral protrusions do not overlap and contact each other to allow the hinge-rod retainer to be moved laterally and rotated about the hinge rod at the first end of the belt row to move the stop from the blocking position when the first hinge joint is articulated by an angle that is greater than the maximum angle the modular belt can articulate in standard running operation.

24. A conveyor comprising:

a conveyor belt advancing along a conveying path having one or more conveying path segments, wherein the conveyor belt includes:

a conveying surface extending laterally from a first side to a second side;

sideguards standing up from the conveying surface along the first and second sides;

a modular cover belt advancing along a belt path parallel to the conveying path along at least one of the one or more belt path segments, wherein the modular cover belt includes:

a series of belt rows of one or more belt modules each extending laterally from a first side to a second side and in length from a first end to a second end, wherein the first end of a belt row is hingedly linked to the second end of an adjacent belt row at a hinge joint;

slider belt modules at the first and second sides and including:

first cam surfaces along the first ends and second cam surfaces along the second ends;

an outer surface on each slider belt module;

a recess opening onto the second end of each slider belt module;

a slide body in each recess along the first or second side and having a clamp jaw and second slide cam surfaces along the second end;

a stationary clamp jaw in each module body along the first or second side to form clamps along the first and second sides with the clamp jaws on adjacent belt rows of the slide body;

wherein the clamp jaws clamp the sideguards of the conveyor belt when some of the first cam surfaces of a slider belt module push against corresponding second slide cam surfaces in an adjacent belt row to slide the slide body laterally in a first direction to close the clamp jaws as the adjacent belt rows articulate into a belt path segment parallel to one of the conveying path segments and to unclamp the sideguards of the conveyor belt when other of the first cam surfaces of the slider belt module push against corresponding second slide cam surfaces in an adjacent belt row to slide the slide body laterally in an opposite second direction to open the clamp jaws as the adjacent belt rows articulate out of the belt path segment parallel to the conveying path segment.

* * * * *